A. WOLFF.
CARPENTER'S LEVEL.
APPLICATION FILED AUG. 19, 1914.
1,199,224.
Patented Sept. 26, 1916.
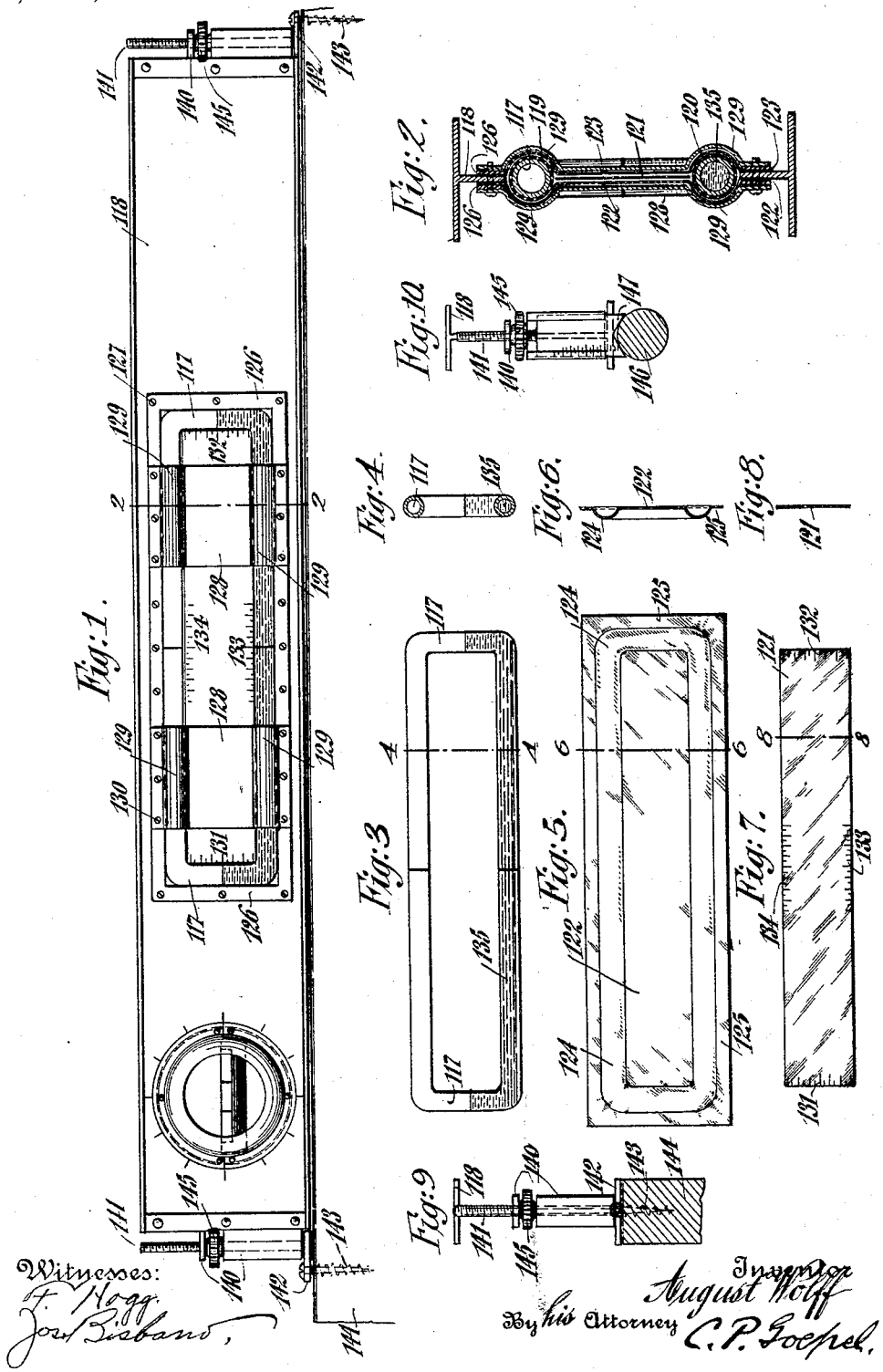

UNITED STATES PATENT OFFICE.

AUGUST WOLFF, OF NEW YORK, N. Y.

CARPENTER'S LEVEL.

1,199,224.  Specification of Letters Patent.   Patented Sept. 26, 1916.

Application filed August 19, 1914. Serial No. 857,466.

*To all whom it may concern:*

Be it known that I, AUGUST WOLFF, a citizen of the United States, residing in New York, in the State of New York, have invented certain new and useful Improvements in Carpenters' Levels, of which the following is a specification.

The present invention relates to levels for use by carpenters, masons, and other artisans, and an object of the invention is to provide a simple efficient means for mounting and protecting levels, whereby the same will be clearly exposed to view for readily and conveniently reading the same, and will be amply protected from becoming broken.

With these and other objects in view my invention is shown in the accompanying drawings, and will be hereinafter more fully described with reference thereto, and finally pointed out in the claims.

In the accompanying drawings, Figure 1 is a side view of a level embodying my invention. Fig. 2 is a vertical section, on a larger scale, on line 2—2 of Fig. 1, Fig. 3 is a side-view of the level-tube detached, Fig. 4 is a vertical section on line 4—4 of Fig. 3, Fig. 5 is a side-view of one of the plates of cellon by which the level-tube is protected, Fig. 6 is a vertical section on line 6—6, Fig. 5, Fig. 7 is a side-view of a scale-plate employed with the level-tube, Fig. 8 is a vertical section on line 8—8 of Fig. 7, Fig. 9 is an end-view, partly in section, of Fig. 1, and Fig. 10 is a similar view of a modified construction, applied to a round shaft.

Similar reference numerals indicate corresponding parts throughout the various figures.

Referring to the drawings, the body or bar 118 of the level is made of metal or other suitable non-yielding material, being I-shaped in cross-section, and having the medial portion of the vertical web cut away to form a rectangular recess in which is adapted to rest the glass level tube 117, made rectangular in form, that is to say, it is an endless tube of oblong shape having its long axis in line with the longitudinal axis of the level bar 118. This level tube is secured in position in a suitable opening in the bar 118, in the position shown in Fig. 1. For securing the level tube, two elastic cushioning means 119, 120, which may be conveniently made of rubber tubing split longitudinally so that it may be applied to the tube, are placed respectively upon the upper and lower horizontal limbs of the level tube near one end of the same. Similar cushions are placed near the other end of the tube. In the space at the interior of the tube is placed a graduated scale plate 121. Two plates 122 and 123 of cellon are now placed in position, one at each side of the level tube, whereby the scale plate 121 is retained in position. Each plate is provided with a depression or channel 124, extending continuously around the same and registering with the level tube 117, which thereby enables the plates to lie closely against the tube and reduce the thickness of the space between them opposite the scale plate 121. Beyond said groove or channel 124, each plate is provided with a flange 125. One of the cellon plates is placed at one side of the level bar 118, and the other plate at the other side, as clearly seen in section in Fig. 2. A rim 126 is now applied over the cellon plate 122, said rim extending entirely around and upon the flange 125 of the same. A similar rim is applied to the other cellon plate 123 at the other side of the level bar, and said rims are secured in place by screws 127 fastened therethrough, and thereby the cellon plates with the level tube and scale plate between them, are secured in position in the opening of the level bar.

For the greater protection of the level tube and the better support for the same rigidly in place, transverse clips 128 are provided, of which four are employed in the construction shown in the drawing. These are of any suitable metal, and extend transversely across the opening in the level bar, and are provided with outwardly-curved portions 129, to receive the correspondingly curved portions 124 of the cellon plates. At their ends the clips 128 are attached to the level bar by screws 130 which also pass through the rims 126. The entire structure is thereby firmly connected with the level bar, and the level tube is securely held in place and protected by the clips. The clips may be made of any width. In the drawing they are shown as located and extending between the scale graduations, at the ends, and at the middle of the scale plate 121, so as not to obscure these graduations 131, 132, 133, 134, respectively. The level tube is filled to one-half its capacity with alcohol or any other suitable liquid 134. When the level bar is in the level position as indicated in Fig. 1, the surface of the liquid in the two vertical limbs of the level tube is at equal height and is shown by the scale graduations 131, 132. When the level is applied in vertical position, the surface of the liquid is at equal height in the elongated horizontal limbs of the level tube which are then in vertical position. Any variations from the level position to any other position, is shown by the difference in elevation of the liquid in both limbs, which difference may be readily read upon the scale.

It is obvious that the level tube may be made of any desired length and proportions, and that the scales may be of any desired degree of fineness so that thereby the approach of the level to absolute accuracy is brought extremely close.

For convenience in applying the level to a long strip or bar of material, when it is desired to extend the use of the level over large surfaces, there is provided at each end of the bar 118, a bracket 140 in which is guided a screw 141 which carries at its lower end a foot 142, through which may be passed a screw 143 for attachment to the longitudinal bar 144. A thumb-nut 145 upon the screw 141, enables the level bar 118 to be raised or lowered away from or toward the longitudinal bar 144, and thereby be exactly leveled or placed at any desired inclination upon the longer bar.

When it is desired to apply the level for the purpose of leveling shafts or other cylindrical surfaces, the foot is provided with an angular recess 145 adapted to span the arc of the shaft 146, as shown in Fig. 10, whereby good contact with the shaft is obtained, and the level is easily held in place thereon.

The improvements herein described render the carpenter's level capable of a large number of uses to which it was hitherto not adapted, some of which have been hereinbefore pointed out, and others of which will readily occur to those skilled in the art of the tool.

It is obvious that changes in the construction may be made without departing from the spirit of the invention as set forth in the following claims.

I claim:

1. A carpenter's level comprising a bar having an opening therein, a level tube arranged within the opening, having its outer peripheral portion conforming to and substantially engaging all sides of said opening, the faces of which tube project beyond the surface of said bar, and transparent means extending over the level tube having concavities therein conforming in shape to the projecting faces of the said level tube, for retaining the same within the opening formed within the bar.

2. A carpenter's level comprising a bar having a rectangular opening therein, a level tube arranged within the opening having its outer peripheral portion conforming to and substantially engaging all sides of said opening, the faces of which tube project beyond the surface of said bar, and transparent means extending over the level tube having concavities therein conforming in shape to the projecting faces of the said level tube, for retaining the same within the opening formed within the bar.

3. A carpenter's level comprising a bar having an opening formed therein, a transparent graduated scale plate resting therein adapted to be read from either side of said bar, and a level tube encircling said plate.

4. In a level comprising a bar having an opening therein, an endless level tube mounted within the space inclosed by the opening, a scale plate mounted within the space inclosed by the tube, and having graduations on the sides thereof adapted to be read from either side of the said bar.

5. In a level comprising a bar having a rectangular opening therein, an endless tube mounted therein and bent to conform to the outline of the opening, a scale plate arranged within the tube rectangle, and the graduations on the scale plate adapted to register with the vertical sides of the level tube.

6. In a level comprising a bar being I-shaped in cross-section having an opening formed in its medial portion, a level tube arranged in the opening bent to form a figure having parallel sides and a scale plate arranged within the figure formed by the tube, transparent plates secured to the opposite sides of the bar and enveloping the tube for retaining the same within the bar.

7. In a level comprising a bar having a rectangular opening therein, a level tube bent to form a rectangle corresponding to the opening and resting therein, a scale plate resting within the rectangle formed by the level tube, transparent plates inclosing the tube and scale plate, flanges formed with the transparent plates, and means for rigidly connecting the flanges to the bar.

8. In a level comprising a bar, a level tube resting within the bar, transparent plates for inclosing the tube each having a recess formed therein semi-circular in cross section for the reception of the tube, and means for rigidly connecting the plates to the bar, whereby the tube may be retained in position upon the bar.

9. In a level comprising a bar having an opening formed therein, a continuous level tube resting within said opening, a scale plate resting within the opening formed by the tube, transparent plates for enveloping and securing in position the tube and scale plate, the said transparent plates being permanently connected to the bar, and non-transparent plates secured to the bar on each side thereof and extending over the transparent plates for the purpose specified.

In testimony, that I claim the foregoing as my invention, I have signed my name in presence of two subscribing witnesses.

AUGUST WOLFF.

Witnesses:
F. HOGG,
JOS. BISBANO.